United States Patent
Okumura et al.

(10) Patent No.: US 6,600,715 B2
(45) Date of Patent: Jul. 29, 2003

(54) OPTICAL REPRODUCING DEVICE AND CONTROL METHOD THEREOF

(75) Inventors: Tetsuya Okumura, Neyagawa (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/955,827

(22) Filed: Sep. 19, 2001

(65) Prior Publication Data

US 2002/0034137 A1 Mar. 21, 2002

(30) Foreign Application Priority Data

Sep. 20, 2000 (JP) ........................ 2000-285879

(51) Int. Cl.[7] ................................ G11B 7/24
(52) U.S. Cl. .................................. 369/275.1
(58) Field of Search ................ 369/275.1, 124.05, 369/116, 47.5, 59.18, 275.4, 94, 53.35, 53.36

(56) References Cited

U.S. PATENT DOCUMENTS

| | | | | |
|---|---|---|---|---|
| 4,769,804 A | * | 9/1988 | Satoh et al. | 347/247 |
| 5,134,606 A | * | 7/1992 | Sekiguchi et al. | 369/116 |
| 5,610,897 A | * | 3/1997 | Yamamoto et al. | 369/124.03 |
| 5,818,807 A | | 10/1998 | Kuroda et al. | 369/116 |
| 5,896,365 A | * | 4/1999 | Hiroki | 369/275.4 |
| 6,067,284 A | | 5/2000 | Ikeda et al. | 369/116 |
| 6,111,841 A | | 8/2000 | Iida et al. | 369/116 |

FOREIGN PATENT DOCUMENTS

JP 10-289500 10/1998

* cited by examiner

*Primary Examiner*—William Korzuch
*Assistant Examiner*—Kimlien T. Le
(74) *Attorney, Agent, or Firm*—Edwards & Angell, LLP; David C. Conlin; George W. Hartnell, III

(57) ABSTRACT

In an optical reproducing device in accordance with the present invention, based on an error rate used in a test read for determining an optimal reproducing power, the value of an error rate corresponding to the maximum burst error which can be corrected by an error correction circuit is obtained. With this structure, an error caused when reproducing power deviates from the optimal reproducing power determined by the test read due to an control error can be corrected by the error detection circuit.

13 Claims, 5 Drawing Sheets

OPTICAL REPRODUCING DEVICE AND CONTROL METHOD THEREOF

FIELD OF THE INVENTION

The present invention relates to a reproducing device for an optical recording medium arranged so as to improve reproducing resolution by controlling the size of an opening section for reading out a record mark by means of heat generated by the irradiation of a light beam, using a so-called magnetic super resolution medium, and a control method thereof. More particularly, the present invention relates to an optical reproducing device such as an optical disk device which can optimally control the irradiation strength of a light beam during reproduction, and a control method thereof.

BACKGROUND OF THE INVENTION

In magneto-optical devices, for a magneto-optical disk of the magnetic super resolution type provided with a recording layer and an in-plane magnetized reproducing layer, a method has been proposed in which a light beam is irradiated to the magneto-optical disk from the reproducing layer side so as to reproduce a record mark smaller than a spot diameter of the light beam. In the foregoing method, a portion of the reproducing layer within an area irradiated by the light beam is heated by the light beam, and the temperature thereof rises above a predetermined level (hereinafter, the portion is referred to as an aperture). Then, to the foregoing portion, the magnetic property of a corresponding portion of the recording layer is copied, and the magnetic property of the foregoing portion of the reproducing layer changes from in-plane magnetization to perpendicular magnetization. In this way, a record mark smaller than the spot diameter of the light beam can be reproduced.

However, in the foregoing method, although the light beam is generated by a constant driving current, there are some cases where an optimal reproducing power of the light beam might vary depending on the changes in the ambient temperature during reproduction, etc. If the value of the reproducing power deviates from the value of the optimal reproducing power, reading errors are more likely to occur. Specifically, if the reproducing power becomes much stronger than the optimal level, the aperture formed becomes too large. Consequently, the output of reproduction signals from tracks adjacent to the track being reproduced is increased, and the proportion of noise signals included in the reproduced data is increased, resulting in the increase in the probability of reading errors. If the reproducing power is much weaker than the optimal level, the aperture formed becomes smaller than the record mark, and the output of the reproduction signals from the track to be read is also reduced, also resulting in the increase in the probability of reading errors.

To cope with the foregoing problem, Japanese Unexamined Patent Publication No. 10-289500/1998 (Tokukaihei 10-289500, published on Oct. 27, 1998) discloses a technique in which two types of patterns for reproducing power control having different mark lengths (short and long) are reproduced, and the reproducing power is controlled in such a manner that a ratio between amplitudes of reproduction signals (hereinafter referred to as a reproduction signal amplitude ratio) obtained from these two patterns gets close to a predetermined optimal value, permitting the reproducing power to be kept at an optimal value and the probability of reading errors to be reduced. Here, the optimal value of the reproduction signal amplitude ratio is obtained by a test read. That is, during the test read, a test pattern is reproduced with the value of the power of a reproducing light beam changed sequentially so as to measure an error rate, and the power of the reproducing light beam having the lowest error rate when reproducing data is obtained as an optimal reproducing power [see FIG. 6($c$)]. Then, a ratio Vs/Vl between a reproduction signal amplitude value Vs of a short mark pattern and a reproduction signal amplitude value Vl of a long mark pattern [see FIG. 6($a$)] when the optimal reproducing power is provided is determined as an optimal amplitude ratio [see FIG. 6($b$)].

In the foregoing conventional technique, the power of the reproducing light beam having the lowest error rate obtained by the test read is determined as the optimal reproducing power. Meanwhile, when controlling the reproducing power, reproducing power control errors are caused by various reasons, including errors of the detected reproduction signal amplitude ratio due to noise, etc.; conversion errors due to the differences in conditions such as tilt, temperature, and defocus, between when the optimal amplitude ratio is obtained and when the reproducing power is actually controlled; and errors in circuits such as a laser driver. That is, there is a possibility that the reproducing power actually generated as a result of the control might deviate from the optimal reproducing power to some extent. Since the direction of the foregoing deviation (whether the reproducing power becomes greater or smaller than the optimal reproducing power) is not fixed, the reproducing power can deviate to both directions.

When the foregoing deviation is caused, as shown in FIG. 6($c$), the increase rate of the error rate differs according to whether the reproducing power is greater than the optimal reproducing power or smaller than the optimal reproducing power. This is because the reasons for error increase are different when the reproducing power is greater than the optimal reproducing power and when it is smaller than the optimal reproducing power. The difference in the increase rate of the error rate with respect to the direction of the deviation from the optimal reproducing power is dependent on individual characteristics of a disk and an optical pick up. For example, as shown in FIG. 6($c$), in the case where the error rate increases more steeply when the reproducing power is greater than the optimal reproducing power, there is a possibility that the error rate might increase extremely if the reproducing power control error occurs so as to increase the reproducing power (make the reproducing power greater than the optimal reproducing power). That is, since the increase rate of the error rate differs substantially depending on the direction the reproducing power control error occurs, there has been a high possibility that an uncorrectable error might be caused when the reproducing power control error occurs in the direction where the error rate increases extremely.

SUMMARY OF THE INVENTION

It is therefore the object of the present invention to provide a reproducing device for an optical recording medium, arranged so as to improve reproducing resolution by controlling the size of an opening section for reading out a record mark by means of heat generated by the irradiation of a light beam, using a so-called magnetic super resolution medium, and more particularly, to provide an optical reproducing device such as an optical disk device which can optimally control the irradiation strength of a light beam during reproduction.

To achieve the foregoing object, an optical reproducing device in accordance with the present invention is structured so as to include:

reproducing means for changing power of a reproducing light beam during test read, and for reproducing test data stored on an optical recording medium for each level of the power;

error detection means for detecting an error rate of the test data that have been reproduced;

error correction means for correcting an error caused during reproduction; and optimal power determining means for determining an optimal reproducing power based on a condition in which the power of the reproducing light beam in which the error rate that has been detected is not more than an error rate corresponding to a maximum burst error which can be corrected by the error correction means.

According to the foregoing invention, a reproducing light beam is irradiated to an optical recording medium, and based on a reflected light from the optical recording medium, information is reproduced with an error, if any, corrected by the error correction means.

During the test read, the power of the reproducing light beam is changed, the test data stored in the optical recording medium is reproduced by the reproducing means for each level of the power, and the reproducing light beam having the optimal power is determined based on the reproduction result. Here, there are some cases where a control error is caused by the change in the ambient temperature during reproduction, etc., which does not allow the reproducing light beam having the optimal power to be irradiated to the optical recording medium. As a result, the error rate increases and error correction cannot be performed, increasing the probability of reproduction errors.

Hence, according to the foregoing invention, when the optimal power for the reproducing light beam is determined by the optimal power determining means, the error rate detected by the error detection means is determined based on the power of the reproducing light beam in such a manner that the error rate that has been detected is not more than the error rate corresponding to the maximum burst error which can be corrected by the error correction means. With this structure, even if an error is caused in the power control of the reproducing light beam and the error rate increases, the error rate is not more than the error rate corresponding to the maximum burst error correctable by the error correction means, therefore the error caused can be surely corrected by the error correction means.

That is, even if the determined optimal power and an actually emitted power do not match due to a control error and thus the error rate increases, the optimal power for the reproducing light beam is determined so as to prevent the condition that the error rate increases too much and the error cannot be corrected by the error correction means. With this structure, the error correction means can surely correct the error caused, providing a highly reliable optical reproducing device.

For a fuller understanding of the nature and advantages of the invention, reference should be made to the ensuing detailed description taken in conjunction with the accompanying drawings.

DESCRIPTION OF THE PREFERRED EMBODIMENTS

Referring FIGS. 1 through 5, the following description will describe an embodiment of the present invention.

Figure 2:
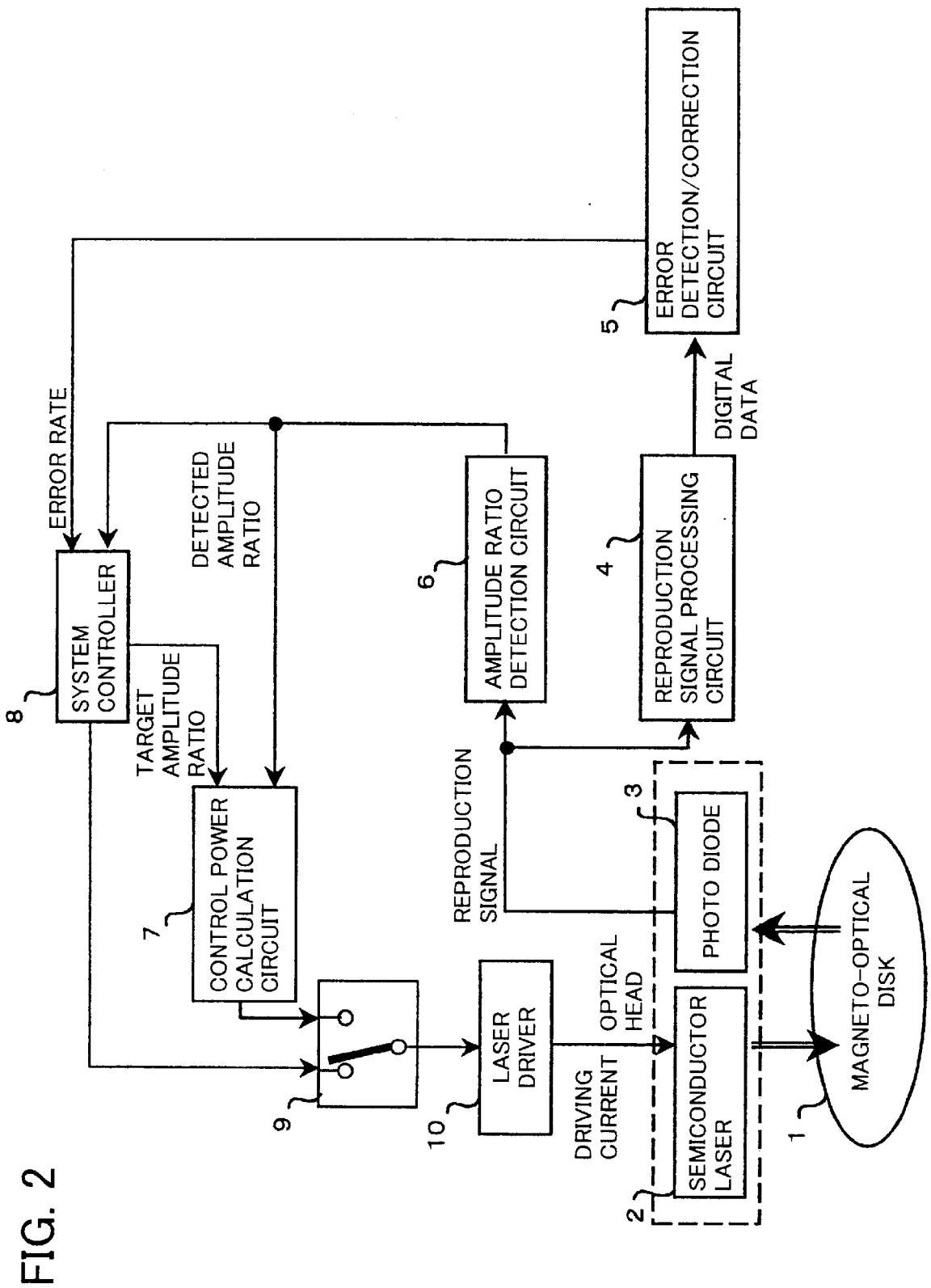
FIG. 2 is a block diagram of a magneto-optical disk reproducing device in accordance with the embodiment of the present invention.
Figure 3:
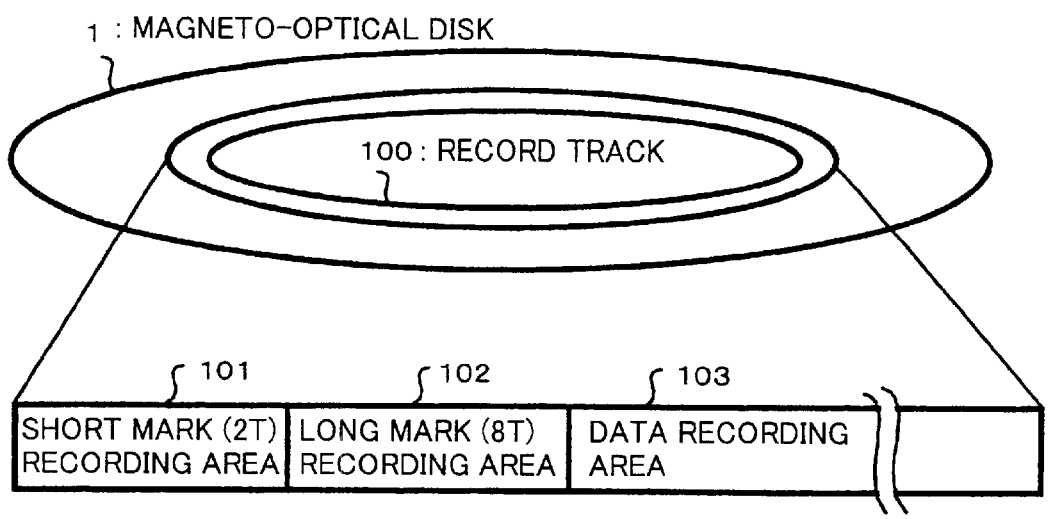
FIGS. 3(a) and 3(b) are schematic views showing a structure of a record track recorded in the magneto-optical disk shown in FIG. 2.
Figure 3:
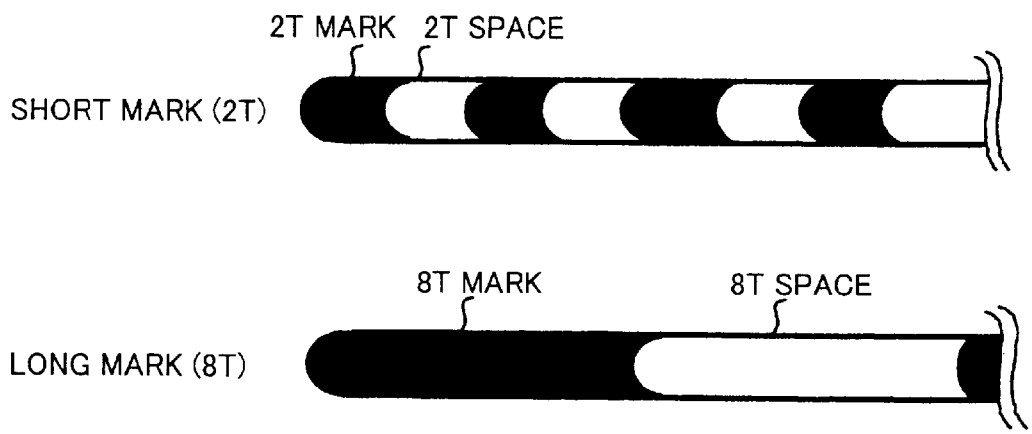

FIG. 2 is a block diagram showing a structure of a magnetic super resolution magneto-optical disk reproducing device (hereinafter simply referred to as an optical reproducing device) to which the present invention is applied.

As shown in FIG. 2, the optical reproducing device in accordance with the present invention is structured so as to include a magnetic super resolution type magneto-optical disk 1 (an optical recording medium), a semiconductor laser 2, a photo diode 3, a reproduction signal processing circuit 4, an error detection/correction circuit 5 (error detection means/error correction means), an amplitude ratio detection circuit 6, a control power calculation circuit 7, a system controller 8 (optimal power determining means) made up of a CPU (central processing unit), etc., a switch 9, and a laser driver 10.

The error detection/correction circuit 5 receives reproduction digital data, and detects the number of byte errors during a test read, and carries out error correction processing during normal reproduction. The switch 9 switches between power set by the system controller 8 and power set by the control power calculation circuit 7. The semiconductor laser 2, the photo diode 3, the reproduction signal processing circuit 4, the amplitude ratio detection circuit 6, the control power calculation circuit 7, the system controller 8, the switch 9, and the laser driver 10 perform the function as reproducing means and power control means.

Examples of the magneto-optical disk 1 include an optical disk using the MSR (Magnetically-induced Super Resolution) method. The MSR method is a method for obtaining super resolution reproduction property by using an optical disk which has a reproducing layer and a recording layer and is structured so as to read out data written on the recording layer by magnetic optical effect, with the magnetized condition of the reproducing layer changed. Basically, the MSR method can be classified into the FAD (front aperture detection) method, the RAD (rear aperture detection) method, and the CAD (center aperture detection) method.

FIG. 3(a) is a schematic view showing the structure of a record track of the magneto-optical disk 1. As shown in FIG. 3(a), the magneto-optical disk 1 is structured so as to include a record track 100. The record track 100 is structured so as to include a short mark recording area 101 recording a short mark (having a mark length of 2T where T is a channel bit length), a long mark recording area 102 recording a long mark (having a mark length of 8T where T is a channel bit length), and a data recording area 103 recording digital data.

Referring to FIGS. 2, 3(a), and 3(b), the following will explain the reproduction operation of the optical reproducing device. First, the optical reproducing device performs a test read when it is activated with the magneto-optical disk 1 installed, or when the magneto-optical disk 1 is installed into it. In the test read, first, light emitted from the semiconductor laser 2 is irradiated to data for the test read on the record track 100, which is recorded beforehand in the magneto-optical disk 1. The data for the test read may be recorded to the magneto-optical disk 1 just before the test read, or the data already recorded previously may be used as the data for the test read. Here, reproducing power of the semiconductor laser 2 is controlled by the laser driver 10, with its value set by the system controller 8 selected by the switch 9.

The light reflected from the record track 100 is converted by the photo diode 3 into a reproduction signal, and reproduction signals produced by converting the light reflected from the short mark recording area 102 and from the long mark recording area 103 are supplied to the amplitude ratio detection circuit 6. A reproduction signal from the data recording area 103 is supplied to the reproduction signal processing circuit 4, subjected to processing such as amplification, equalization, quantization, and digital demodulation, in the reproduction signal processing circuit 4, then supplied to the error detection/correction circuit 5 as digital data (reproduction digital data).

The number of error bytes of the digital data obtained as described above is detected by the error detection/correction circuit 5, and a byte error rate, obtained by dividing the number of error bytes by the total number of bytes of the foregoing digital data, is supplied to the system controller 8. Meanwhile, in the amplitude ratio detection circuit 6, an amplitude ratio between the short mark pattern (2T) and the long mark pattern (8T) is obtained from the inputted reproduction signals, and the amplitude ratio is supplied to the system controller 8. Then, the system controller 8 stores the reproducing power set as described above, the foregoing byte error rate corresponding to the reproducing power, and the foregoing amplitude ratio corresponding to the reproducing power, in a memory, etc.

In the foregoing test read, the above-mentioned processing is repeated with the value of the reproducing power set by the system controller 8 changed, and a byte error rate and an amplitude ratio in each level of the reproducing power are obtained. Based on the result of the test read, the minimum value and the maximum value of the reproducing power having the byte error rate equal to a predetermined threshold are obtained, and a mean value between the minimum and the maximum values is determined as an optimal reproducing power. Examples of the method for changing the reproducing power include a method in which the reproducing power is gradually increased step by step. Then, an amplitude ratio between the short mark pattern and the long mark pattern corresponding to the optimal reproducing power is determined as a target amplitude ratio, and the test read is completed. Here, the foregoing threshold may be, for example, automatically set by the system controller 8 in accordance with the error correction capability of the error detection/correction circuit 5, or set by operating an operation section provided in the system controller 8.

After the test read is completed, during the normal reproduction of the record track 100, the control power calculation circuit 7 compares a detected amplitude ratio obtained by the amplitude ratio detection circuit 6 from the reproduction signals from the short mark recording area 101 and the long mark recording area 102, and the target amplitude ratio obtained by the system controller 8 as a result of the test read. Then, a value of the reproducing power which minimizes the difference between the detected amplitude ratio and the target amplitude ratio is fed back from the control power calculation circuit 7 to the switch 9, and the value of the reproducing power is selected by the switch 9 and supplied to the laser driver 10. The comparison between the detected amplitude ratio and the target amplitude ratio and the feedback of the value of the reproducing power as described above are repeated, and thus the reproducing power of the semiconductor laser 2 is controlled so as to be always close to the optimal reproducing power.

When the foregoing optimal reproducing power is provided, the error rate is not more than an error rate corresponding to the maximum burst error which can be corrected by the error detection/correction circuit 5. That is, the error rate in accordance with errors in the reproduction signal from the data recording area 103 reproduced by the optimal reproducing power is within a range correctable by the error detection/correction circuit 5. Therefore, the reproduction signal from the data recording area 103 is transmitted via the reproduction signal processing circuit 4, subjected to error correction processing in the error detection/correction circuit 5, and decoded as digital data with an extremely low error rate.

The foregoing optical reproducing device may be structured to further include temperature detection means for detecting the temperature of the magneto-optical disk 1 at regular time intervals, and optimal power modification means for modifying the optimal reproducing power, when the difference in the temperatures of consecutive two points detected by the temperature detection means is above a predetermined value, according to the temperature difference. With this structure further including the temperature detection means and the optimal power modification means, the effect on the optimal reproducing power caused by changes in the temperature of the optical recording medium can be modified.

Figure 1:
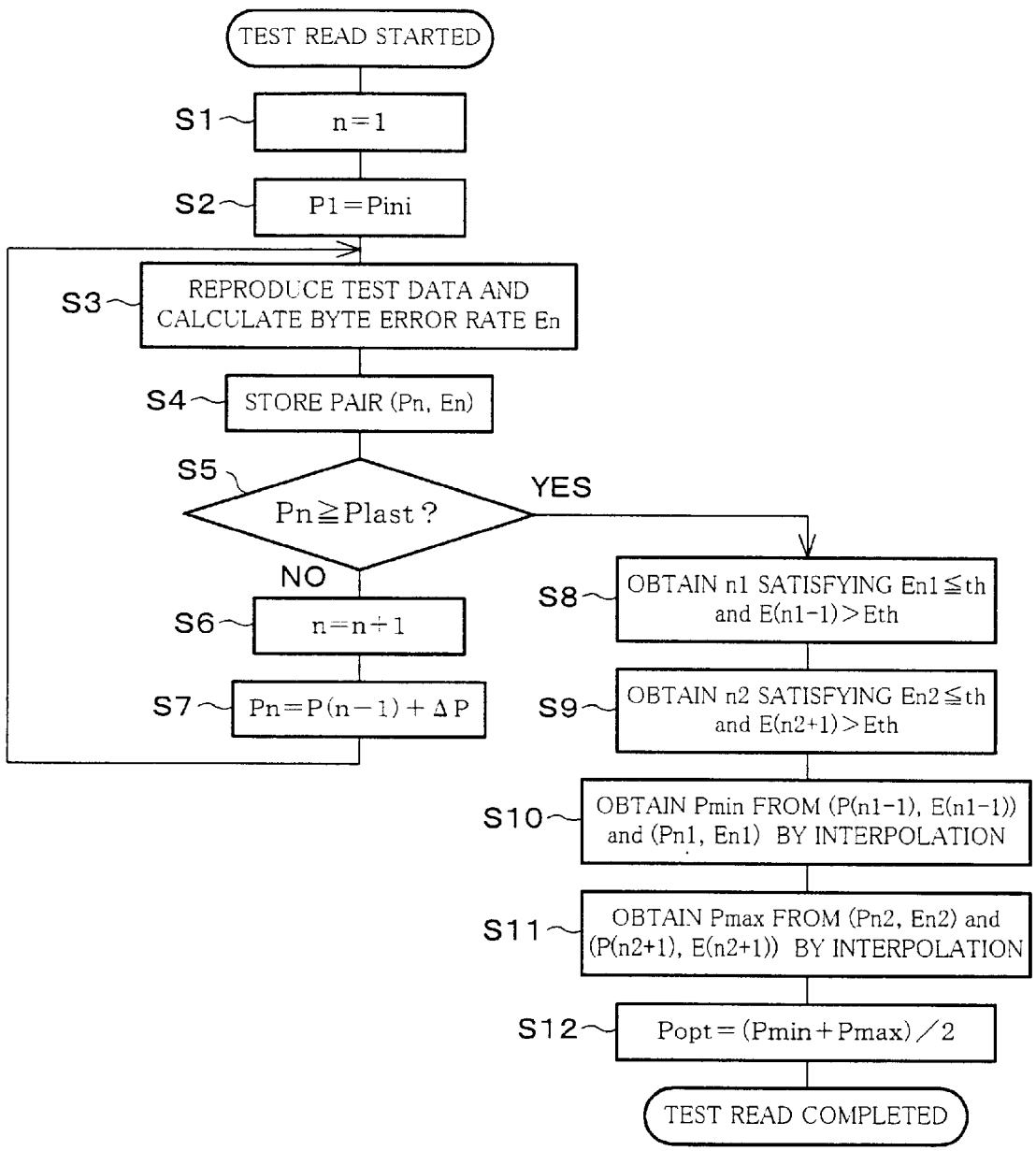
FIG. 1 is a flow chart explaining a procedure of a test read in a reproducing device in accordance with one embodiment of the present invention.
Figure 4:
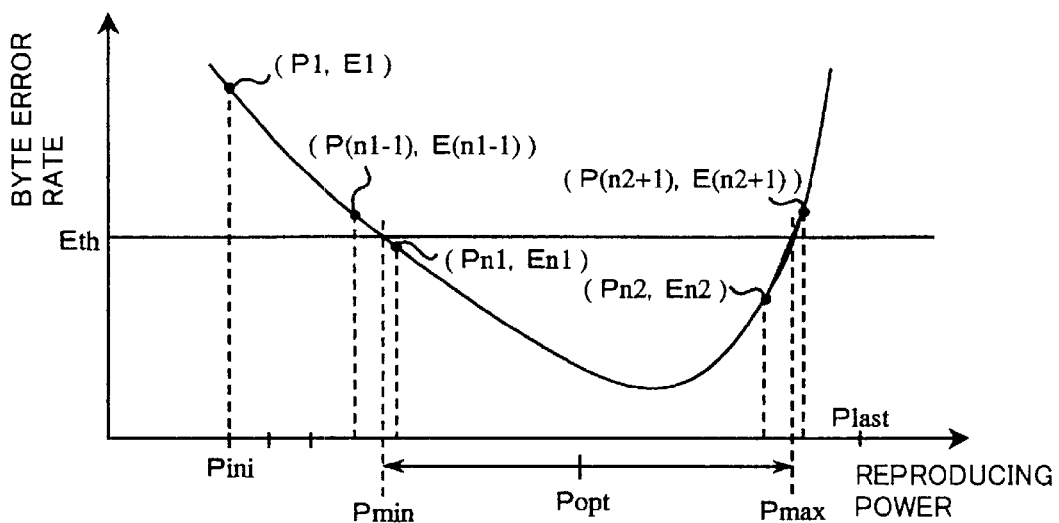
FIG. 4 is a schematic graph showing each level of power set in the test read.

FIG. 1 is a flow chart explaining the procedure of the test read for determining the optimal reproducing power in the optical reproducing device in accordance with the present invention. FIG. 4 is a schematic graph showing the relationship between the reproducing power and the byte error rate. Referring to FIGS. 1 and 4, the following description will explain the procedure of the test read, that is, the control operation of the system controller 8, which is the optimal power determining means, in more detail.

First, it is set as n=1 (in step S1), then it is set as P1=Pini, as an initial value of the reproducing power (in step S2). Here, Pini is an initial value of a reproducing power P of a laser beam irradiated from the semiconductor laser 2 on the magneto-optical disk 1. Pini is set so as to be smaller than Pmin, which is the minimum value of the range of the reproducing power having the byte error rate not more than a threshold Eth, and so as to be under servo control such as tracking and focus (see FIG. 4).

Then, the system controller 8 calculates a byte error rate E1 obtained when test data is reproduced in the case where the reproducing power is P1 (in step S3), and stores a reproducing power Pn and a byte error rate En obtained when the test data is reproduced in the case where the reproducing power is Pn, in the form of a pair (Pn, En) (in step S4). Then, the system controller 8 judges if Pn≧Plast or not (in step S5).

If it is judged that Pn≧Plast is not satisfied in step S5, the value of n is increased by one (in step S6), and the reproducing power is changed by ΔP, as shown in the equation (1)

(in step S7). Here, ΔP is the range of change for changing the reproducing power.

$$Pn=P(n-1)+\Delta P \tag{1}$$

Then, a sequence goes back to step S3, and the operation for obtaining (Pn, En) is repeated in the same way. With such a procedure, the pair (Pn, En), which is the combination of the reproducing power Pn and the byte error rate En obtained when the test data is reproduced in the case where the reproducing power is Pn, can be obtained within the range where Pn=Pini to Plast. On the other hand, if it is judged as Pn≧Plast in step S5, a sequence goes to step S8.

In step S8, n1 satisfying En1<Eth and E(n1−1)>Eth is obtained. That is, among the measured values (Pn, En) obtained by the foregoing operation, the combination (Pn1, En1), where Pn1 is the minimum value of the reproducing power Pn having the byte error rate En smaller than a threshold Eth, and En1 is the byte error rate when the reproducing power is Pn1, is obtained.

Next, n2 satisfying En2≦Eth and E(n2+1)>Eth is obtained (in step S9). That is, among the measured values (Pn, En) obtained by the foregoing operation, the combination (Pn2, En2), where Pn2 is the maximum value of the reproducing power Pn having the byte error rate En smaller than the threshold Eth, and En2 is the byte error rate when the reproducing power is Pn2, is obtained.

Then, the minimum reproducing power Pmin, in which the byte error rate is equal to Eth, is obtained from (P(n1−1), E(n1−1)) and (Pn1, En1) by interpolation (in step S10). Next, the maximum reproducing power Pmax, in which the byte error rate is equal to Eth, is obtained from (Pn2, En2) and (P(n2+1), E(n2+1)) by interpolation (in step S11). Lastly, by the equation (2), the value obtained by adding the minimum reproducing power Pmin and the maximum reproducing power Pmax, then dividing the added value by two, is determined as an optimal reproducing power Popt (in step S12).

$$Popt=(Pmin+Pmax)/2 \tag{2}$$

Here, the following will consider the condition which the threshold Eth should satisfy so as to obtain a highly reliable optimal reproducing power. Recently, an error correction circuit used in an optical reproducing device for a DVD, etc. has a correction capability to completely correct a burst error (continuous errors) of up to 2,790 bytes in maximum, as disclosed in a magazine "O plus E" (No. 199, the issue of June 1996, on pages 93 to 97). Since the total number of bytes per error correction processing unit in the DVD is 38,688 bytes, the byte error rate corresponding to the burst error is $7\times10^{-2}$. Consequently, if an error caused in the foregoing optical reproducing device for the DVD, etc., is a burst error, by determining the threshold as Eth=$7\times10^{-2}$, the byte error rate obtained when reproducing the magneto-optical disk 1 such as the DVD in the case where the reproducing power P is within the range of Pmin≦P≦Pmax becomes not more than the threshold Eth. Therefore, the error rate remains within the range so that the number of errors included in the error rate can be completely corrected by the error correction circuit.

By determining Popt, which is a mean value within the range of Pmin≦P≦Pmax obtained as mentioned above, as the optimal reproducing power, the distance between the optimal reproducing power Popt and Pmin and the distance between the optimal reproducing power Popt and Pmax become equal. Therefore, it becomes possible to prevent the situation where the error rate increases extremely when a deviation from the optimal reproducing power due to a control error is caused in one direction, which occurs in a case where the reproducing power having the lowest error rate is determined as the optimal reproducing power. That is, the possibility that a burst error caused when the reproducing power P deviates from Popt due to a reproducing power control error can be completely corrected by the error detection/correction circuit 5 can be maximized.

However, errors caused in an actual reproducing device include not only a burst error but also a great number of a random error, which occurs discretely. When including the random error in the errors, the maximum byte error rate which can be corrected by the error detection/correction circuit 5 becomes smaller than the byte error rate corresponding to the burst error only. Besides, since the random error is dependent on its occurrence form, the value of the error rate caused by the random error is not fixed.

Therefore, the threshold Eth may be determined so as to have a value not more than the error rate corresponding to the correctable maximum number of burst error bytes, according to the error occurrence form expected in system design. In the foregoing DVD, Eth is determined so as to have a value not more than $7\times10^{-2}$, which is obtained considering only the burst error which can be corrected by the error detection/correction circuit 5, so if also considering the random error, Eth may be determined, for example, to be $1\times10^{-2}$.

Figure 5:
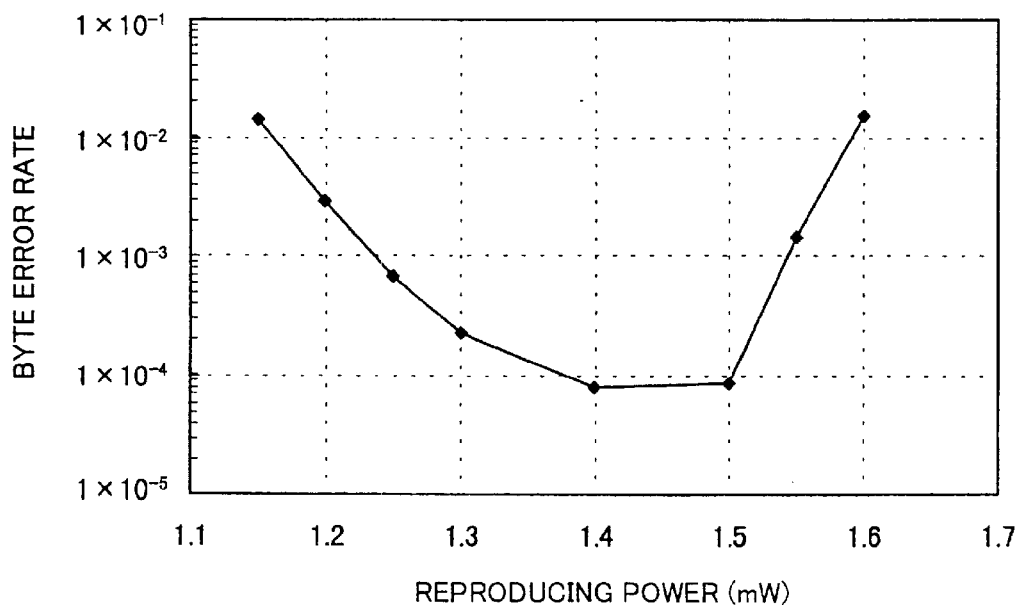
FIG. 5 is a graph showing a measurement result of reproducing power and a byte error rate.
Figure 6:
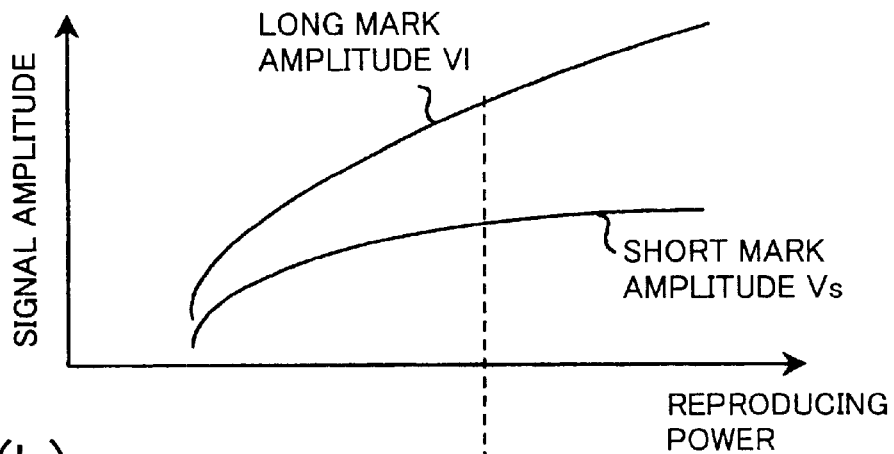
FIGS. 6(a) through 6(c) are schematic graphs showing the changes of signal amplitudes, an amplitude ratio, and an error rate in response to reproducing power in a conventional example.
Figure 6:
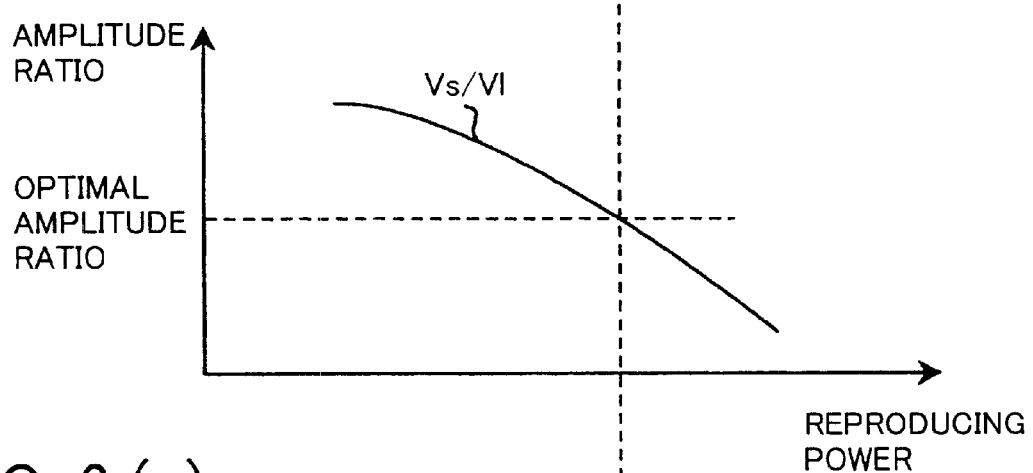
Figure 6:
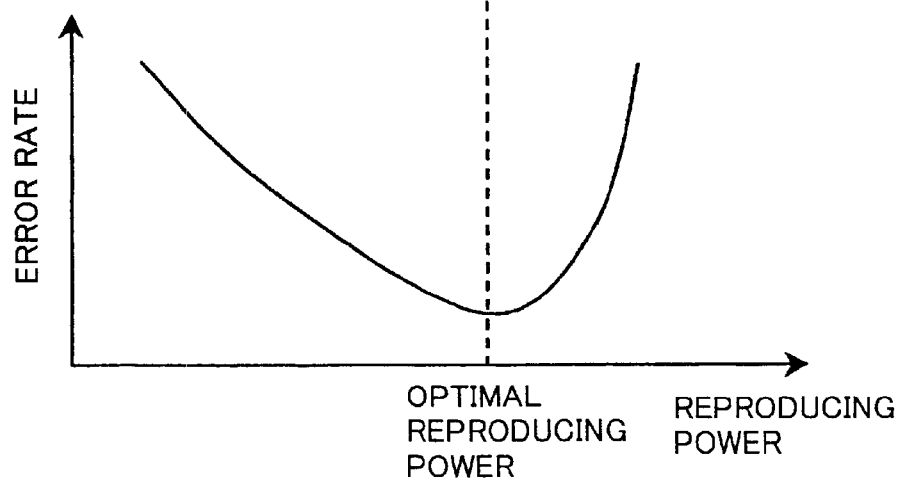

On the other hand, test data in the test read may include a defect, and the part of the defect always causes an error bit regardless of the reproducing power, causing an error in the result of the test read. FIG. 5 is a graph showing an actual measurement result of the relationship between the reproducing power and the byte error rate. The horizontal axis represents the reproducing power, and the vertical axis represents the byte error rate. As shown in FIG. 5, the more the byte error rate is, the more the percentage of change in the byte error rate with respect to the change in the reproducing power is. In other words, the smaller the error rate caused by reasons other than a defect in the test data (that is, caused by the reproducing power) is, the more the effect by the defect is.

Therefore, the smaller the threshold Eth set at the test read is, the more the optimal reproducing power Popt obtained by the foregoing operation is subjected to the effect by the defect. That is, considering the effect of the defect included in the test data on the optimal reproducing power Popt, it is not appropriate to set the threshold Eth at a too small value. It is clear from the result shown in FIG. 5 that the percentage of change in the byte error rate with respect to the change in the reproducing power can be increased by setting the minimum value of Eth, set as the threshold, at around $1\times10^{-3}$.

As described above, by setting the threshold Eth so as to satisfy the foregoing condition, that is, by setting Eth within the range from $1\times10^3$ to $7\times10^{-2}$, the possibility that the error caused when the reproducing power deviates from Popt due to a control error can be completely corrected by the error detection/correction circuit 5 is enhanced. At the same time, since the optimal reproducing power Popt determined by the test read is not much subjected to the effect by the defect included in the test data, highly reliable reproducing power control can be achieved.

In the foregoing embodiment, explanation has been given on a structure in which a single error detection/correction circuit 5 serves as error detection means for detecting the number of byte errors in test data during the test read and as error correction means for performing error correction processing during the normal data reproduction. In this manner, by using the error detection/correction circuit 5 serving as the error detection means and as the error correction means, only a small-scale circuit modification is required when adding the function for detecting/outputting the number of errors to the error detection/correction circuit 5. However, it is also possible to provide the error detection means and the error correction means separately. For example, the error detection means may be provided independently as a structure such that a data pattern used in the test read is stored in a ROM (read only memory), etc., as a known pattern, and directly compared with the reproduced digital data.

In the foregoing embodiment, the value obtained by dividing the total number of errors caused during the test read by the total number of bytes is regarded as the byte error rate. However, for example, when the number of continuous errors is more than a predetermined level or when a part of the reproduced test data has an extremely large number of errors, it is allowed that the part is judged as a defect, and the value calculated with the number of errors of the part excluded from the total number of errors and the total number of bytes may be regarded as a substantial byte error rate. Besides, in the foregoing embodiment, explanation has been given on a magneto-optical disk reproducing device as an example of an optical reproducing device, but the optical reproducing device is not limited to this. For example, the present invention may be applied to an optical reproducing device for such as an optical disk of phase change type.

Incidentally, a first optical reproducing device, which is a reproducing device for an optical recording medium, may be structured as an optical reproducing device so as to include:

power setting means for changing reproducing power of a light beam step by step;

reproducing means for reproducing test data on the optical recording medium for each level of the changed reproducing power;

error detection means for detecting an error rate of the test data reproduced by the reproducing means;

optimal power determining means for determining an optimal reproducing power based on the reproducing power having an error rate not more than a predetermined threshold; and error correction means for correcting an error caused during reproduction, wherein the optimal power determining means determines the optimal reproducing power, regarding a value not more than an error rate corresponding to the maximum burst error which can be corrected by the error correction means as the predetermined threshold.

A second optical reproducing device may be structured such that, in the first optical reproducing device, the optimal power determining means determines the optimal reproducing power based on a mean value between the maximum value and the minimum value of the reproducing power having an error rate not more than the predetermined threshold.

A third optical reproducing device may be structured such that, in the first optical reproducing device, the error correction means can correct a burst error of up to 2,790 bytes in maximum, and the optimal power determining means sets a value within the range of a byte error rate from $1\times10^{-3}$ to $7\times10^{-2}$ as the predetermined threshold.

A fourth optical reproducing device may be structured as the first optical reproducing device further including power control means for controlling the reproducing power so that a ratio between reproduction signal amplitudes from two specific mark patterns, a long mark pattern and a short mark pattern, becomes a target value, wherein the power control means sets the amplitude ratio obtained when the optimal reproducing power determined by the optimal power determining means is provided, as the target value.

It is preferable that the optimal power determining means determines the mean value between the maximum value and the minimum value of the power of the reproducing light beam in which the detected error rate satisfies the foregoing condition, as the optimal reproducing power.

According to the foregoing structure, when an actually emitted reproducing power deviates from the optimal reproducing power, if the degree of the deviation is within a certain range, the error rate is allowed to be not more than the error rate corresponding to the maximum burst error correctable by the error correction means, regardless of the direction of the deviation.

Therefore, it becomes possible that the error rate is prevented from increasing extremely when a deviation is caused in one direction because the increase ratio of the error rate differs substantially depending on the direction of the deviation from the optimal reproducing power. That is, if the degree of the deviation between the actually emitted reproducing power and the optimal reproducing power is within a certain range, the error rate can be set within the range correctable by the error correction means regardless of the direction of the deviation, and thus the data on the optical recording medium can be decoded as the data with an extremely low error rate.

It is preferable that the error correction means can correct a burst error of up to around 2,790 bytes in maximum, and the optimal power determining means determines the optimal reproducing power based on the power of the reproducing light beam in which the detected byte error rate is not more than a threshold ranging from $1\times10^{-3}$ to $7\times10^{-2}$.

Since the total number of bytes per error correction processing unit in a DVD, etc., is 38,688 bytes, the byte error rate corresponding to the foregoing burst error is $7\times10^{-2}$. Consequently, if an error caused is a burst error, error correction is surely performed by the error correction means, as long as the byte error rate is not more than $7\times10^{-2}$.

On the other hand, test data in the test read may include a defect, and the part of the defect always causes an error bit regardless of the reproducing power, causing an error in the result of the test read. Generally, the more the byte error rate is, the more the percentage of change in the byte error rate with respect to the change in the reproducing power is. Consequently, the smaller the byte error rate caused by reasons other than a defect in the test data is, the more the effect by the defect is, and the more the error rate is, the less the effect is. Therefore, it is not possible to set the byte error rate at a too small value, and it is preferable to set the minimum value of the byte error rate at $1\times10^{-3}$. With this structure, it becomes possible to surely prevent the result of the test read from becoming unusual due to the defect, permitting to provide an optical reproducing device performing reliable reproducing power control.

The optical reproducing device of the present invention is characterized by further including power control means for controlling the reproducing power so that a ratio between reproduction signal amplitudes from a plurality of types of mark patterns becomes a ratio between reproduction signal amplitudes obtained when the optimal reproducing power determined by the optimal power determining means is provided.

According to the foregoing structure, since the reproduction signal amplitudes from a plurality of types of mark patterns change respectively according to the power of the reproducing light beam, the ratio between the reproduction signal amplitudes varies according to the power of the reproducing light beam. That is, since the ratio between the reproduction signal amplitudes comes to have a value corresponding to the power of the reproducing light beam, the ratio between the reproduction signal amplitudes corresponding to the optimal reproducing power becomes a predetermined value.

Therefore, by controlling the reproducing power so that the ratio between the reproduction signal amplitudes becomes the reproduction signal amplitude ratio obtained when the optimal reproducing power is provided, the reproducing power for the data on an optical recording medium can be controlled to be the optimal reproducing power. That is, the data on the optical recording medium can be decoded as the data with an extremely low error rate.

The optical reproducing device of the present invention is characterized in that the error detection means and the error correction means are realized by a single ECC (error correcting codes) circuit.

According to the foregoing structure, less circuit modification when adding a function to the error correction means is required, compared with the case where the error detection means and the error correction means are provided as separate circuits.

The optical reproducing device of the present invention is characterized in that the optical recording medium is a magneto-optical disk of super resolution type, in which, by generating an aperture smaller than a spot diameter of an irradiated light beam on a reproducing layer, recorded information from a recording layer is copied and reproduced.

According to the foregoing structure, recorded information in a region smaller than the spot diameter of the light beam can be read. Incidentally, when the temperature of the optical recording medium changes, a diameter of the aperture changes, and the optimal reproducing power changes accordingly. Consequently, the foregoing structure may further include temperature detection means for detecting the temperature of the optical recording medium at regular time intervals, and optimal power modification means for modifying the optimal reproducing power, when the difference in the temperatures of consecutive two points detected by the temperature detection means is above a predetermined value, according to the temperature difference. With this structure, even if the temperature of the optical recording medium suddenly changes, the data on the optical recording medium can be decoded as the data with an extremely low error rate.

The optical reproducing device of the present invention is characterized by including temperature detection means for detecting the temperature of the optical recording medium at regular time intervals, and optimal power modification means for modifying the optimal reproducing power, when the difference in the temperatures of consecutive two points detected by the temperature detection means is above a predetermined value, according to the temperature difference.

With this structure, even if the temperature of the optical recording medium suddenly changes, the data on the optical recording medium can be decoded as the data with an extremely low error rate. Therefore, the effect on the optimal reproducing power caused by the changes in the temperature of the optical recording medium can be modified.

A method for controlling the optical reproducing device of the present invention is structured so as to include the steps of:

changing the power of a reproducing light beam during a test read;

reproducing test data stored in an optical recording medium for each level of the power;

detecting an error rate of the test data that have been reproduced;

correcting an error caused during reproduction; and determining an optimal reproducing power based on the power of the reproducing light beam in which the error rate that has been detected is not more than an error rate corresponding to the correctable maximum burst error.

According to the foregoing structure, the reproducing light beam is irradiated to the optical recording medium, and based on a reflected light from the optical recording medium, information is reproduced with an error, if any, corrected.

During the test read, the power of the reproducing light beam is changed, the test data stored in the optical recording medium is reproduced for each level of the power, and the reproducing light beam having the optimal power is determined based on the reproduction result. Here, there are some cases where a control error is caused by the change in the ambient temperature during reproduction, etc., which does not allow the reproducing light beam having the optimal power to be irradiated to the optical recording medium. As a result, the error rate increases and error correction cannot be performed, increasing the probability of reproduction errors.

Hence, according to the foregoing invention, the error rate detected when determining the optimal power for the reproducing light beam is determined based on the power of the reproducing light beam in such a manner that the detected error rate is not more than the error rate corresponding to the correctable maximum burst error. With this structure, even if an error is caused in the power control of the reproducing light beam and the error rate increases, the error rate is not more than the error rate corresponding to the correctable maximum burst error, therefore the error caused can be surely corrected.

That is, even if the determined optimal power and an actually emitted power do not match due to a control error and thus the error rate increases, the optimal power for the reproducing light beam is determined so as to prevent the condition that the error rate increases too much and the error cannot be corrected. With this structure, the error caused can be surely corrected, and a highly reliable optical reproducing device can be provided.

It is more preferable to determine the mean value between the maximum value and the minimum value of the power of the reproducing light beam in which the detected error rate satisfies the foregoing condition, as the optimal reproducing power.

With this structure, when the actually emitted reproducing power deviates from the optimal reproducing power, if the degree of the deviation is within a certain range, the error rate is allowed to be not more than the error rate corresponding to the maximum burst error correctable by the error correction means, regardless of the direction of the deviation.

Further, it is more preferable that a burst error of up to around 2,790 bytes in maximum can be corrected, and that the optimal reproducing power is determined based on the power of the reproducing light beam in which the detected byte error rate is not more than a threshold ranging from $1\times10^{-3}$ to $7\times10^{-2}$.

The total number of bytes per error correction processing unit in a DVD, etc., is 38,688 bytes, and the byte error rate corresponding to the foregoing burst error is $7\times10^{-2}$. Consequently, with this structure, if an error caused is a burst error, error correction is surely performed, as long as the byte error rate is not more than $7\times10^{-2}$.

On the other hand, test data in the test read may include a defect, and the part of the defect always causes an error bit regardless of the reproducing power, causing an error in the result of the test read. Generally, the more the byte error rate is, the more the percentage of change in the byte error rate with respect to the change in the reproducing power is. Consequently, the smaller the error rate caused by reasons other than a defect in the test data is, the more the effect by the defect is, and the more the error rate is, the less the effect is. Therefore, it is not possible to set the byte error rate at a too small value, and it is preferable to set the minimum value of the byte error rate at $1\times10^{-3}$. With this structure, it becomes possible to surely prevent the result of the test read from becoming unusual due to the defect, permitting to provide an optical reproducing device performing reliable reproducing power control.

Furthermore, it is more preferable to control the reproducing power so that a ratio between reproduction signal amplitudes from a plurality of types of mark patterns becomes a ratio between reproduction signal amplitudes when the determined optimal reproducing power is provided.

With this structure, since the reproduction signal amplitudes from a plurality of types of different mark patterns change respectively according to the power of the reproducing light beam, the ratio between the reproduction signal amplitudes varies according to the power of the reproducing light beam. That is, since the ratio between the reproduction signal amplitudes comes to have a value corresponding to the power of the reproducing light beam, the ratio between the reproduction signal amplitudes corresponding to the optimal reproducing power becomes a predetermined value.

Therefore, by controlling the reproducing power so that the ratio between the reproduction signal amplitudes becomes the reproduction signal amplitude ratio obtained when the optimal reproducing power is provided, the reproducing power for the data on the optical recording medium can be controlled to be the optimal reproducing power. That is, the data on the optical recording medium can be decoded as the data with an extremely low error rate.

It is more preferable that the optical recording medium is a magneto-optical disk of super resolution type, in which, by generating an aperture smaller than a spot diameter of an irradiated light beam on a reproducing layer, recorded information from a recording layer is copied and reproduced.

With this structure, recorded information in a region smaller than the spot diameter of the light beam can be read.

It is more preferable that the temperature of the optical recording medium is detected at regular time intervals, and when the difference in the temperatures of consecutive two points detected by the temperature detection means is above a predetermined value, the optimal reproducing power is modified according to the temperature difference.

With this structure, even if the temperature of the optical recording medium suddenly changes, the data on the optical recording medium can be decoded as the data with an extremely low error rate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling an optical reproducing device comprising the steps of:

changing power of a reproducing light beam during a test read;

reproducing test data stored in an optical recording medium for each level of the power;

detecting an error rate of the test data that have been reproduced;

correcting an error caused during reproduction; and determining an optimal reproducing power of the reproducing light beam between a minimum reproducing power $P_{min}$ and a maximum reproducing power $P_{max}$, in which the detected error rate is smaller than a predetermined threshold $E_{th}$, and the threshold $E_{th}$ of the error rate is not more than an error rate corresponding to a maximum burst error that can be corrected during the step of correcting an error caused during reproduction.

2. The method for controlling the optical reproducing device of claim 1, wherein the step of determining an optimal reproducing power comprises determining a mean value between a maximum value and a minimum value of the power of the reproducing light beam in which the detected error rate satisfies the condition.

3. The method for controlling the optical reproducing device of claim 1, further comprising the steps of:

correcting a burst error of up to around 2,790 bytes in maximum; and determining the optimal reproducing power based on the power of the reproducing light beam in which the detected byte error rate is not more than a threshold ranging from $1\times10^{-3}$ to $7\times10^{-2}$.

4. The method for controlling the optical reproducing device of claim 1, further comprising the step of:

controlling the reproducing power so that a ratio between reproduction signal amplitudes from a plurality of types of mark patterns becomes a ratio between reproduction signal amplitudes obtained when the determined optimal reproducing power is provided.

5. The method for controlling the optical reproducing device of claim 1, wherein the step of reproducing test data stored in an optical recording medium comprises reproducing test data stored in a magneto-optical disk of super resolution type, wherein by generating an aperture smaller than a spot diameter of an irradiated light beam on a reproducing layer, recorded information from a recording layer is copied and reproduced.

6. The method for controlling the optical reproducing device of claim 1, further comprising the steps of:

detecting a temperature of the optical recording medium at regular time intervals; and modifying the optimal reproducing power, when a difference in the detected temperatures of consecutive two points is above a predetermined value, according to the temperature difference.

7. An optical reproducing device comprising:

reproducing means for changing power of a reproducing light beam during test read, and for reproducing test data stored on an optical recording medium for each level of the power;

error detection means for detecting an error rate of the test data that have been reproduced;

error correction means for correcting an error caused during reproduction; and optimal power determining means for determining an optimal reproducing power of the reproducing light beam, wherein said optimal power determining means determine the optimal reproducing power between a minimum reproducing power $P_{min}$ and a maximum reproducing power $P_{max}$, in which the detected error rate is smaller than a predetermined threshold $E_{th}$, and the threshold $E_{th}$ of the error rate is not more than an error rate corresponding to a maximum burst error which can be corrected by said error correction means.

8. The optical reproducing device of claim 7, wherein:

said optimal power determining means determine a mean value between the minimum reproducing power $P_{min}$ and the maximum reproducing power $P_{max}$ as the optimal reproducing power.

9. The optical reproducing device of claim 7 wherein: the threshold $E_{th}$ of the error rate is set in a range from $1 \times 10^{-3}$ to $7 \times 10^{-2}$.

10. The optical reproducing device of claim 7, further comprising:

power control means for controlling the reproducing power so that a ratio between reproduction signal amplitudes from a plurality of types of mark patterns becomes a ratio between reproduction signal amplitudes obtained when the optimal reproducing power determined by said optimal power determining means is provided.

11. The optical reproducing device of claim 7, wherein:

said error detection means and said error correction means are realized by a single ECC (error correcting codes) circuit.

12. The optical reproducing device of 7, wherein:

the optical recording medium in a magneto-optical disk of super resolution type, in which, by generating an aperture smaller than a spot diameter of an irradiated light beam on a reproducing layer, recorded information from a recording layer is copied and reproduced.

13. The optical reproducing device of claim 7, further comprising:

temperature detection means for detecting a temperature of the optical recording medium at regular time intervals; and optimal power modification means for modifying the optimal reproducing power, when a difference in the temperatures of consecutive two points detected by said temperature detection means is above a predetermined value, according to the temperature difference.

* * * * *